United States Patent [19]

Kinder

[11] 3,945,716

[45] Mar. 23, 1976

[54] ROTATABLE HEAD UP DISPLAY WITH COORDINATE REVERSAL CORRECTIVES

[75] Inventor: Floyd A. Kinder, Ridgecrest, Calif.

[73] Assignee: The United States of America as represented by the Secretary of the Navy, Washington, D.C.

[22] Filed: Dec. 20, 1974

[21] Appl. No.: 534,617

[52] U.S. Cl............... 350/174; 356/252; 250/203 R
[51] Int. Cl.² .......................................... G02B 27/14
[58] Field of Search ............ 350/174, 3.5; 356/251, 356/252; 250/203 R, 203 CT

[56] References Cited
UNITED STATES PATENTS

| | | | |
|---|---|---|---|
| 3,614,314 | 10/1971 | Rossire | 350/174 X |
| 3,737,212 | 6/1973 | Antonson et al. | 350/174 |
| 3,807,829 | 4/1974 | Close | 350/3.5 |
| 3,824,535 | 7/1974 | Rover | 350/174 X |

*Primary Examiner*—David H. Rubin
*Attorney, Agent, or Firm*—R. S. Sciascia; Roy Miller; Gerald F. Baker

[57] ABSTRACT

A rotatable head up display system is provided to furnish target coorindate information to the pilot of an aircraft, for example. The head up display may be slaved to a FLIR or TV tracker to display the scene viewed thereby as well as the azimuth with respect to the aircraft. A small cathode ray tube is used for the display and the scene is viewed through a holographic lens so that the display appears at infinity focus. The pilot is also provided with means for controlling the aiming of the sensor (FLIR, TV, or the like).

8 Claims, 2 Drawing Figures

ROTATABLE HEAD UP DISPLAY WITH COORDINATE REVERSAL CORRECTIVES

BACKGROUND OF THE INVENTION

The invention relates generally to the field of optics and display apparatus, and more particularly to improved weapon sighting devices for use by helicopter aircraft pilots. Prior display systems have been devised which are head coupled or immovably fixed to the aircraft. Head coupled weapon sighting devices have generally been found to be too heavy, bulky and clumsy for use in high speed aircraft under heavy "G-load" configuration. Head up displays which are immovably fixed to the aircraft present confusing coordinate information to the pilot when coupled to FLIR or TV systems.

SUMMARY OF THE INVENTION

According to the present invention the head up display is pivoted to the aircraft on approximately the same axis as the pilot's head. A small cathode ray tube is used for the display from the sensor system and the image is viewed through a holographic lens to give the display the appearance of infinity focus. For night see-through capability and greater contrast in daylight, a photo-chromic backing is used on the holographic lens.

The rotatable display provides the pilot with instant coordinate information when the head is turned to look into the display without the pilot having to do a coordinate transformation or interpolation. The holographic lens provides a very thin light weight display with very high efficiency that can be illuminated off-axis effectively and the photo-chromic backing provides better contrast in daylight. A 180° coordinate correction may be included which enables the pilot to maneuver in a natural manner to align the aircraft with a target after the target is passed.

DESCRIPTION AND OPERATION

Figure 1:
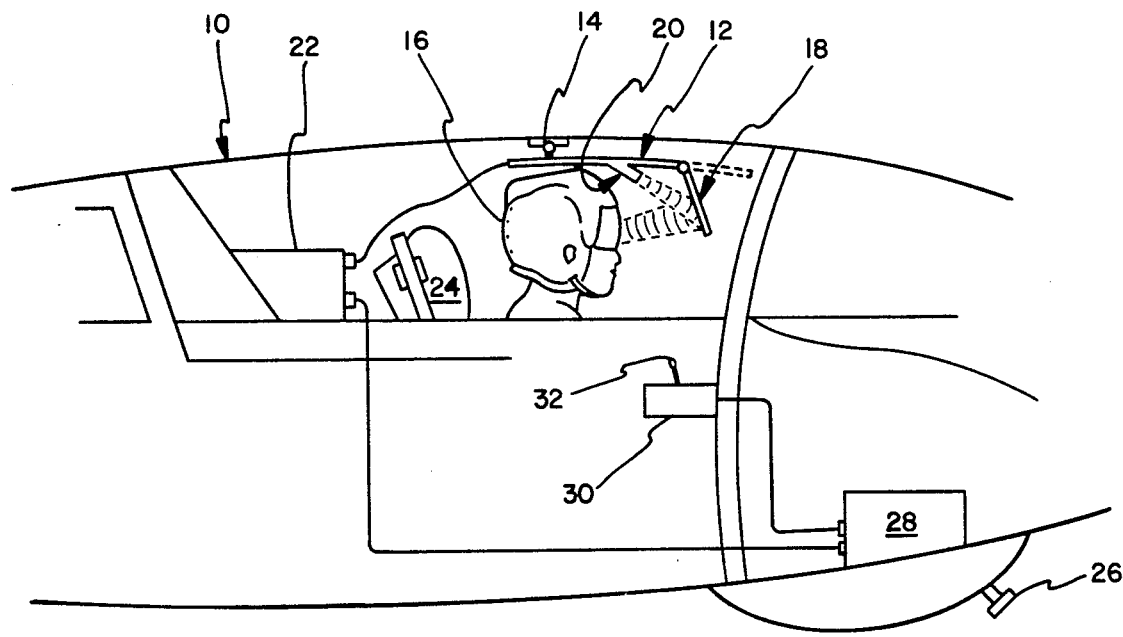
FIG. 1 is a schematic and block diagram of a typical arrangement of the head up display in an aircraft.
Figure 2:
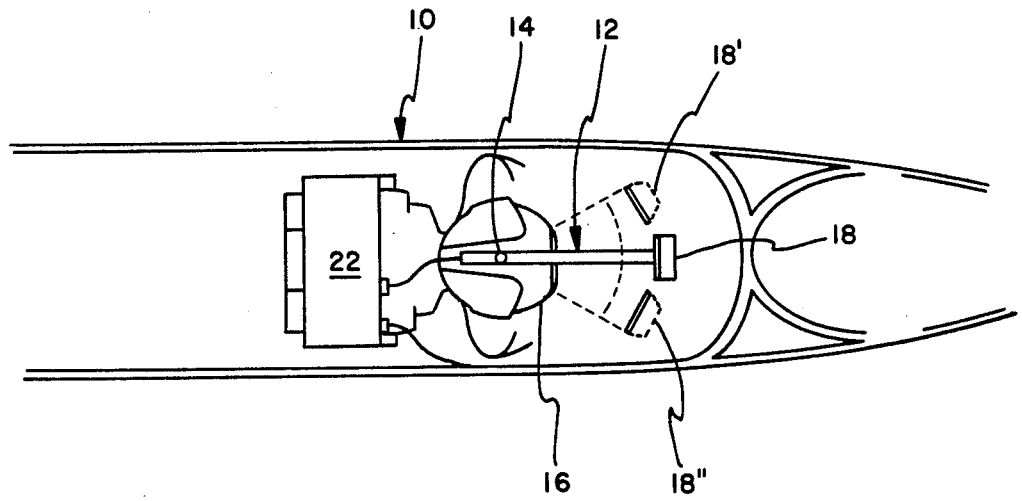
FIG. 2 is a top plan view of the device of FIG. 1.

In the two views of the drawing a typical aircraft 10 is provided with a head up display arm 12 which is pivoted at 14 above the head 16 of the pilot. Arm 12 carries a display plate 18 and means 20 for projecting an image on plate 18.

The projecting means 20 may be either a small cathode ray tube (CRT) or a fiber optic transmitting an image from a larger CRT. The CRT unit may be contained in or controlled by the CRT control unit 22 which is shown situated behind the pilots seat 24.

The image is projected onto a holographic lens or screen 18 which advantageously may be provided with a photo chromic backing, for example, of a dichromate gelatin emulsion.

Signals from control unit 22 also control movement of arm 12 in accordance with signals received in accordance with the position of a sensor 26 which may be moved through automatic sensor control 28 or through a manual controller 30 by a joy stick 32.

OPERATION

When the system is in operation and the pilot acquires a target either automatically through sensor 26 or visually, he may direct lock-on of the sensor 26 or may manually move sensor 26 by means of control 32 to adjust the point of aim. The image picked up by sensor 26 will be displayed on the screen 18 at the azimuth angle and, if the sensor is on automatic control, adjustment of the angle of attack of the aircraft will result in a repositioning of the screen. The image from sensor 26 is viewed through the holographic lens 18 which enlarges the image and causes it to appear to be at infinity. The operator, therefore, can include the image in his field of vision without refocusing from the general field of view outside of the aircraft.

The holographic lens provides a thin light weight display with high efficiency and with the photochromic backing which increases in density in increased light, provides a see-through capability at night and more contrast in daylight. When not in use the display can be tilted up out of the line of sight as shown by the dotted line position in FIG. 1.

As the aircraft passes the target, the image from a following sensor would appear inverted. In order to correct for proper viewing when the target is passed, therefore, the display control is driven 180° out of phase when the target passes out of the front hemisphere. This permits the pilot to fly as if the target were in front of the aircraft except the range would be increasing. This is especially advantageous for use with rearward launched missiles because coordinates would be the same as for forward launched missiles.

What is claimed is:

1. In a visual aid for target acquisition and weapon delivery by an operator from a vehicle, the combination comprising:
   a control arm pivotally mounted to the vehicle above and approximately on the same axis as the head of the operator of the vehicle;
   optical viewing means depending from said arm into the normal field of view of the operator;
   image projection means mounted on said arm in a position to project images onto said optical means;
   movable tracking means on said vehicle for acquiring and tracking a target and trasmitting images to said projection means; and
   means automatically positioning said control arm in response to and in coordination with movement of said tracking means to present said projection means substantially along the azimuth of said target.

2. The apparatus of claim 1 wherein said optic device is holographic lens having a photo chromic backing.

3. The apparatus of claim 2 wherein said image projection means includes a cathode ray tube.

4. The apparatus of claim 3 wherein said image projection means includes fiber optic means transmitting said image from said cathode ray tube to said lens.

5. The apparatus of claim 4 including coordinate reversal means associated with said tracking means effective to drive said control arm 180° out of phase when the target being tracked passes from a position in the front hemisphere with respect to the vehicle to a position in the rear hemisphere.

6. The apparatus of claim 1 wherein said projection means is a cathode ray tube.

7. The apparatus of claim 1 wherein said projection means is a fiber optic and said means for transmitting includes a cathode ray tube.

8. The apparatus of claim 1 including coordinate reversal means associated with said tracking means effective to drive said control arm 180° out of phase when the target being tracked passes from a position in the front hemisphere with respect to the vehicle to a position in the rear hemisphere.

* * * * *